United States Patent
Eick et al.

(10) Patent No.: US 9,817,145 B2
(45) Date of Patent: Nov. 14, 2017

(54) DOWNHOLE INERTIAL MASS SYSTEM

(71) Applicant: CONOCOPHILLIPS COMPANY, Houston, TX (US)

(72) Inventors: Peter Eick, Houston, TX (US); Joel Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/139,823

(22) Filed: Apr. 27, 2016

(65) Prior Publication Data

US 2016/0320513 A1     Nov. 3, 2016

Related U.S. Application Data

(60) Provisional application No. 62/154,438, filed on Apr. 29, 2015.

(51) Int. Cl.
*G01V 1/52* (2006.01)
*B06B 1/18* (2006.01)
*E21B 47/18* (2012.01)
*G01V 1/155* (2006.01)

(52) U.S. Cl.
CPC .............. *G01V 1/52* (2013.01); *G01V 1/155* (2013.01); *B06B 1/183* (2013.01)

(58) Field of Classification Search
CPC ........... G01V 1/52; G01V 1/155; B06B 1/183
USPC .......................................................... 367/25
See application file for complete search history.

(56) References Cited

U.S. PATENT DOCUMENTS

| | | | |
|---|---|---|---|
| 4,709,362 A | 11/1987 | Cole | |
| 4,874,061 A | 10/1989 | Cole | |
| 5,159,160 A | 10/1992 | Brett | |
| 5,229,552 A | 7/1993 | Cole | |
| 5,321,213 A | 6/1994 | Cole | |
| 6,615,949 B1 | 9/2003 | Egerev | |
| 2007/0104030 A1 | 5/2007 | Kusko | |
| 2014/0332199 A1 | 11/2014 | Gilstad | |

OTHER PUBLICATIONS

International Search Report for parent case, App. No. PCT/US2016/029521, dated Jul. 28, 2016.

*Primary Examiner* — Daniel L Murphy
(74) *Attorney, Agent, or Firm* — ConocoPhillips Company (57) ABSTRACT

The invention relates to a downhole inertial mass seismic-source system, apparatus and method for use within a wellbore environment to provide seismic signal energy at a wellbore location. The system comprises a first inertial mass apparatus with a fluid plunger that is in contact with a first wellbore fluid chamber and a second wellbore fluid chamber, a second inertial mass apparatus with a fluid plunger in contact with the first well bore fluid chamber, a third inertial mass apparatus with a fluid plunger in contact with the second well bore fluid chamber, an Inertial Mass Control System (IMCS) connected to the first inertial mass apparatus, and a power source providing power to the Inertial Mass Control System.

28 Claims, 5 Drawing Sheets

DOWNHOLE INERTIAL MASS SYSTEM

CROSS-REFERENCE TO RELATED APPLICATIONS

This application is a non-provisional application which claims benefit under 35 USC §119(e) to U.S. Provisional Application Ser. No. 62/154,438 filed Apr. 29, 2015, entitled "DOWNHOLE INERTIAL MASS SYSTEM," which is incorporated herein in its entirety.

FIELD OF THE INVENTION

The present invention relates generally to generation of seismic energy for the investigation of the earth in the vicinity of a wellbore. More particularly, but not by way of limitation, embodiments of the present invention use the fluid in the wellbore to couple seismic source energy to earth formations.

BACKGROUND OF THE INVENTION

Several types of downhole seismic source acoustic energy generating systems have been utilized for inducing energy into the downhole environment, particularly into the borehole or wellbore wall. The data received from these sources is processed and analyzed to understand the lithology and subsurface environment the wellbores traverse. Typical downhole seismic energy sources include an explosive charge, air gun or some type of vibration inducing device. The approaches vary, but all are thought to have the potential to damage the wellbore. Explosive and air gun sources impact wellbores by point-source localized energy. Vibration sources are limited by the clamping area to the wellbore and are often observed to have poor energy coupling or transmission to the surrounding earth formation. Because many downhole seismic source methods have potential to damage the wellbore, low energy levels must be used and/or have poor coupling to the wellbore and surrounding earth formation, limiting useful seismic waves traveling away from the source. These drawbacks limit the usable or recoverable energy output from a downhole energy pulse or sweep as well as become problematic for source repeatability.

BRIEF SUMMARY OF THE DISCLOSURE

The invention more particularly relates to a downhole inertial mass seismic-source system for use within a wellbore to provide seismic signal energy at a wellbore location. The system includes a first inertial mass apparatus with a fluid plunger that is in contact with a first wellbore fluid chamber and a second wellbore fluid chamber. A second inertial mass apparatus with a fluid plunger is in contact with the first well bore fluid chamber. A third inertial mass apparatus with a fluid plunger is in contact with the second well bore fluid chamber. An Inertial Mass Control System (IMCS) is connected to the first inertial mass apparatus and a power source provides power to the Inertial Mass Control System.

The invention also relates to a downhole inertial mass seismic-source system for use within a wellbore to provide seismic signal energy at a wellbore location. The system includes an inertial mass apparatus with a fluid plunger that is in contact with separate wellbore fluid chambers. A first and second passive plug apparatus are in contact with separate well bore fluid chambers. An Inertial Mass Control System is connected to the first inertial mass apparatus and a power source provides power to the Inertial Mass Control System.

The invention also relates to a downhole inertial mass seismic-source system for use within a wellbore to provide seismic signal energy at a wellbore location. The system includes a first inertial mass apparatus with a fluid plunger that is in contact with a first wellbore fluid chamber. A second inertial mass apparatus with a fluid plunger is in contact with the first well bore fluid chamber. An Inertial Mass Control System (IMCS) is connected to the first inertial mass apparatus and a power source provides power to the Inertial Mass Control System.

BRIEF DESCRIPTION OF THE DRAWINGS

A more complete understanding of the present invention and benefits thereof may be acquired by referring to the follow description taken in conjunction with the accompanying drawings in which.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by claims to be filed in a subsequent non-provisional patent application. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
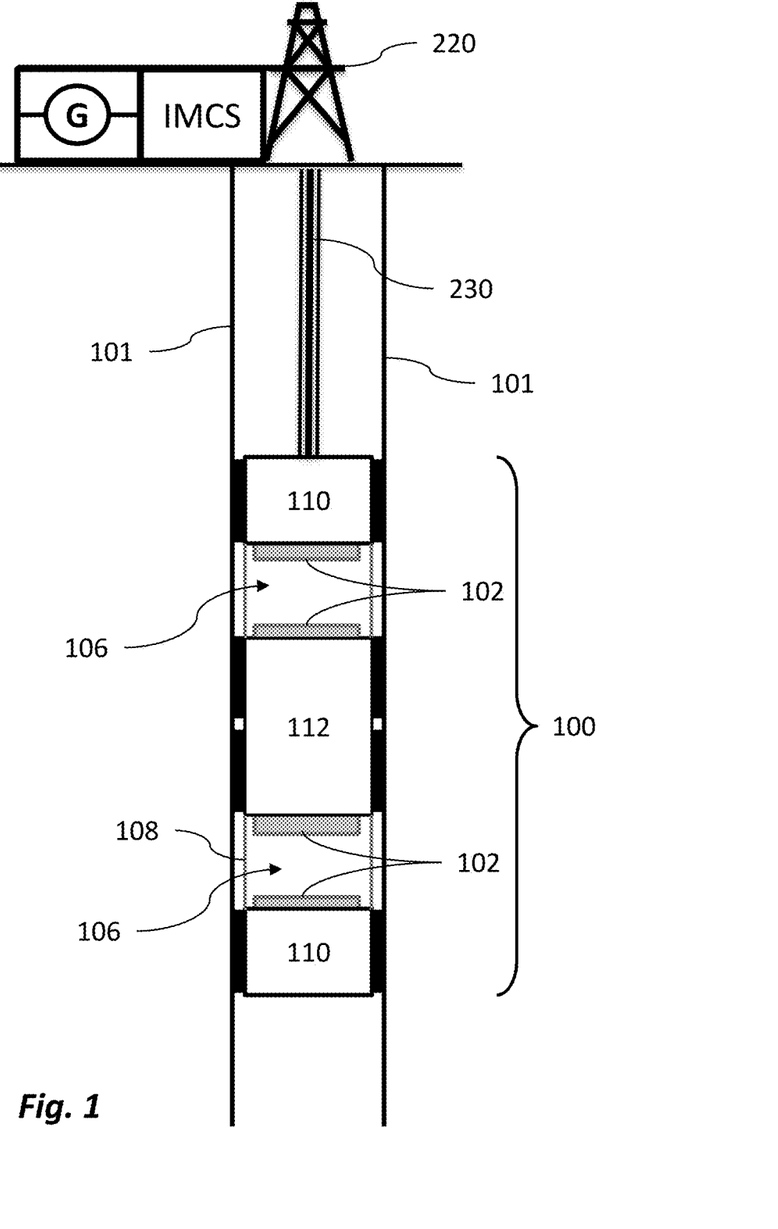
FIG. 1 is a schematic diagram of various aspects that may comprise one or more embodiments of a downhole inertial mass seismic source system.

FIG. 1 is a diagram of an embodiment of a Downhole Inertial Mass System in a wellbore environment that comprises one or more apparatuses 100 deployed within wellbore casing 101 that include Fluid Plungers 102 (inertial masses) associated with Inertial Mass Apparatuses (110 or 112), a control or operating system such as an Inertial Mass Control System (IMCS) and a power source, both located at or near the surface of the earth associated at surface facilities 220, for example at the surface of earth and connected with downhole equipment by way of a wireline 230. At least one embodiment is disclosed herein. Variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means.+−.10% of the subsequent number, unless otherwise stated.

The present disclosure provides a type of wellbore-disposed seismic generation source capable of imparting high levels of seismic energy into the earth formation in the area of a wellbore. The present invention utilizes fluid in the wellbore as the coupling media and as the propagator of the compression wave energy. One embodiment comprising three associated apparatuses 100 of the present disclosure is more particularly illustrated in FIG. 2. A compression wave is generated by the force of one or more fluid plungers 102 associated with an inertial mass apparatus (110 or 112) oscillating against one or more fluid column segments 106 (or fluid chambers) of trapped wellbore fluid media where the fluid does not readily move around the inertial mass apparatus (110 or 112) thus creating pressure in the fluid column segments 106. One inertial mass apparatus (110 or 112) may be connected to another by cables 108 and each inertial mass apparatus anchored in the wellbore by side wall seals 104. At some point along the wellbore away from the inertial mass apparatus, the wellbore is closed by a passive plug or an end unit inertial mass apparatus 110 to trap fluid thus creating the chambers of fluid 106 that act as a waveguide environment for the pressure wave being created. By tuning the oscillation frequency of an inertial mass apparatus 110 or 112, and depending on fluid column 106 length and oscillation frequency for the Fluid Plunger 102, standing waves are created in the fluid.

Figure 2:
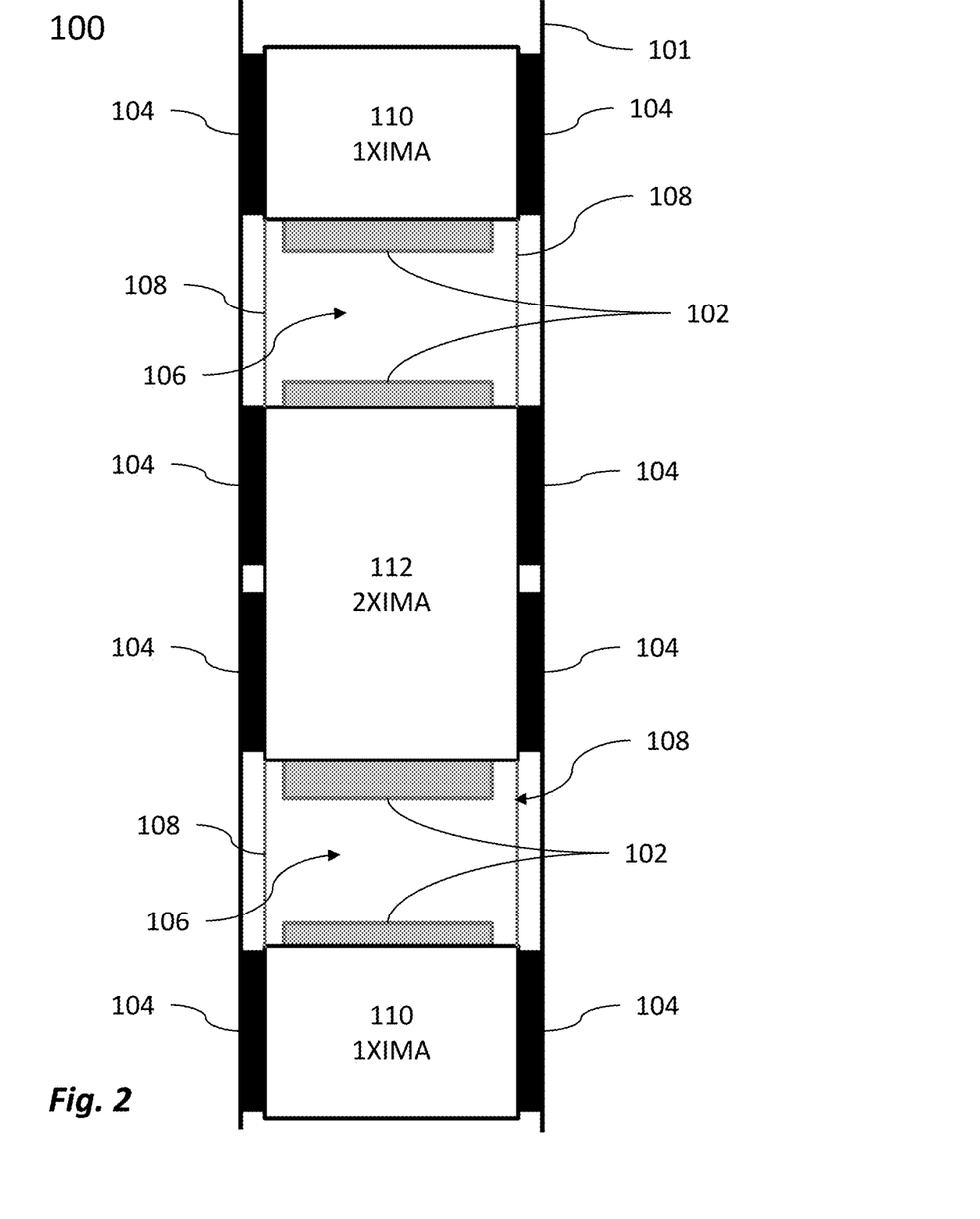
FIG. 2 illustrates one or more embodiments illustrated in FIG. 1 relative to the wellbore.

By altering the oscillation frequency in a predetermined manner the peak compression of the standing wave energy can be oscillated thus creating a pulse. The pulse will be a high pressure point within the fluid that will induce deformation of the wellbore 100 surrounding the fluid column substantially over the length of the fluid chamber 106. The energy transferred by the deformation of the surrounding wellbore will propagate into the surrounding earth formation as seismic signal.

Various nonlimiting embodiments disclosed herein comprise up to four, five or more apparatuses to make up embodiments of a Downhole Inertial Mass Seismic Source suitable for conducting subsurface investigations that may be implemented as a system or as a combination of apparatuses or as one or more methods, or methods of using apparatuses disclosed herein.

The use of a downhole inertial mass seismic source system providing fluid compression waves created by a Fluid-Plunger 102, which is an oscillating inertial mass, while in a wellbore waveguide environment, overcomes problems related to wellbore damage caused by other downhole seismic sources and allows significant seismic energy transfer to the earth formation surrounding the wellbore. The fluid is coupled to the wellbore over an extended distance along the wellbore in a fluid filled segment 106, or fluid chamber, while compression waves propagate within the fluid. The energy from the compression waves will be transferred to the wellbore 100 and be observed as shear wave energy if observed from the surface or as pressure waves from one wellbore to another wellbore.

The compression wave within the fluid chamber is created by the oscillation of a Fluid Plunger 102. The Fluid Plunger 102 is a sliding mass that moves substantially parallel to and within the wellbore 100, which may be coupled with the use of a plug at appropriate spacing from the sliding mass Fluid Plunger 102 so that desired seismic frequency propagation parameters, including the longest wavelength desired, can be achieved. The fluid chamber 106 is formed by the wellbore with an inertial mass apparatus on either end or the wellbore length between an inertial mass apparatus with a passive plug apparatus (PPA).

As illustrated in FIG. 2 a first inertial mass apparatus 2XIMA 112 includes a Fluid Plunger 102 that is oscillated relative to a fixed position of the first inertial mass apparatus 2XIMA 112 within a wellbore. The fluid facing portions of the Fluid Plunger 102 are open to, and in contact with, a fluid chamber 106 on both ends of the first inertial mass apparatus 2XIMA 112. The first inertial mass apparatus 2XIMA 112 includes a tube-like supporting super-structure smaller in diameter than the well bore with industry standard wellbore positional clamping capability and this apparatus oscillates the inertial mass (Fluid Plunger 102) that is contained within the tube-like super-structure of the first inertial mass apparatus 2XIMA 112. The inertial mass 102 may be oscillated within the superstructure of the inertial mass apparatus 112 to create pressure pulses out both ends of the first inertial mass apparatus 2XIMA 112 simultaneously, but the pulses from each end are opposite in polarity. The apparatus 2XIMA 112 may contain sensor devices for detecting the pressure fluctuations within the fluid column and contain the necessary electronics and power couplings to regulate the propulsion or oscillation dynamics of the Fluid Plunger 102 as required. The unit 112 is sealed relative to the wellbore inside surface to a substantial extent to restrict passage of fluid around the inertial mass apparatus 112.

As also illustrated in FIG. 2, a second inertial mass apparatus 1XIMA 110 is a unit that is open to fluid on one end so that the inertial mass 102 is in contact with fluid on only one end. The second inertial mass 1XIMA 110 includes this Fluid Plunger 102 that is oscillated relative to a fixed position of the second inertial mass 2XIMA 112 within a well bore. The second inertial mass apparatus 1XIMA 110 can be categorized as a tube-like structure smaller in diameter than the well bore with industry standard clamping capability and that oscillates the inertial mass 102 that is contained within the tube-like structure of the second inertial mass 1XIMA 110. The inertial mass 102 is then oscillated within the tube superstructure of 110 to create pressure pulses into the fluid chamber 106. The apparatus 110 contain may include transducers for detecting the pressure fluctuations within the fluid column and the necessary electronics and power couplings to regulate the propulsion or oscillation dynamics as required. The unit 110 is sealed relative to the well bore inside surface to a substantial extent to restrict passage of fluid around the inertial mass apparatus 110. Support cables 108 may be provided to link inertial mass apparatuses.

Figure 3:
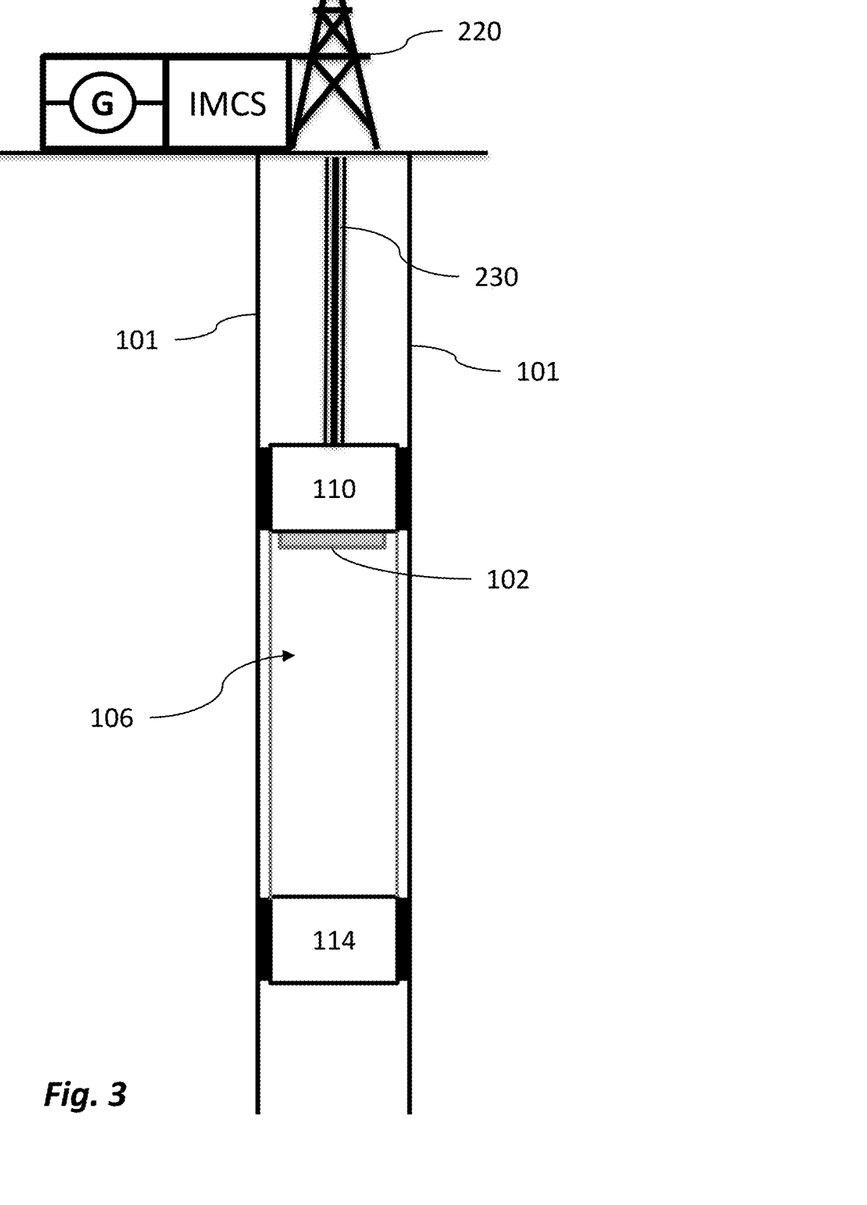
FIG. 3 illustrates another aspect for a Downhole Inertial Mass System deployed to provide seismic energy in the vicinity of a wellbore.

As illustrated in FIG. 3, a third apparatus that may comprise one or more embodiments disclosed here include a passive plug apparatus (PPA), 114 that may contain multiple sensors such as pressure transducers for detecting fluid pressure fluctuations, and may include transducers for detecting any other environmental vibrations. In one aspect, the terminus of a bore hole could serve the function of a PPA in combination with 1XIMA 110 and/or 2XIMA 112, the PPA with or without sensors. So a 1XIMA 110 or a 2XIMA 112 could be used as a PPA with sensors. Again, support cables 108 may be provided to link inertial mass apparatuses together or with PPAs.

A fourth apparatus comprises an Inertial Mass Control System (IMCS) at surface facilities 220 that an operator can utilize to regulate the oscillation of the various inertial mass apparatuses. The control system would create feedback loops of information from the sensors on the inertial mass apparatuses and/or passive plug apparatus so that the operator can program precise oscillation instructions to activate and control the inertial mass apparatuses (110 and 112) and assure that the desired dynamic response is achieved.

A fifth aspect of a Downhole Inertial Mass System includes a power system associated with the IMCS at 220 that provides the power for all the components of the Downhole Inertial Mass System that require power. The IMCS may control the power that goes to any inertial mass apparatus.

In one embodiment of the invention (see FIG. 2), the system is configured so that a 1XIMA 110 is on the bottom (meaning furthest downhole) separated by some distance from a 2XIMA 112 that is separated by some distance from another 1XIMA 110 furthest up hole. The fluid contact openings (i.e., the plungers 102 in contact with the fluid chamber 106) of the 1XIMAs 110 face toward the 2XIMA 112 thus forming two segments of fluid to use as waveguides. The IMCS at 220 is on the surface and is programmed to oscillate one or both 1XIMA 110 and 2XIMA 112 in a manner to create pulses in both fluid filled segments 106.

Figure 4:
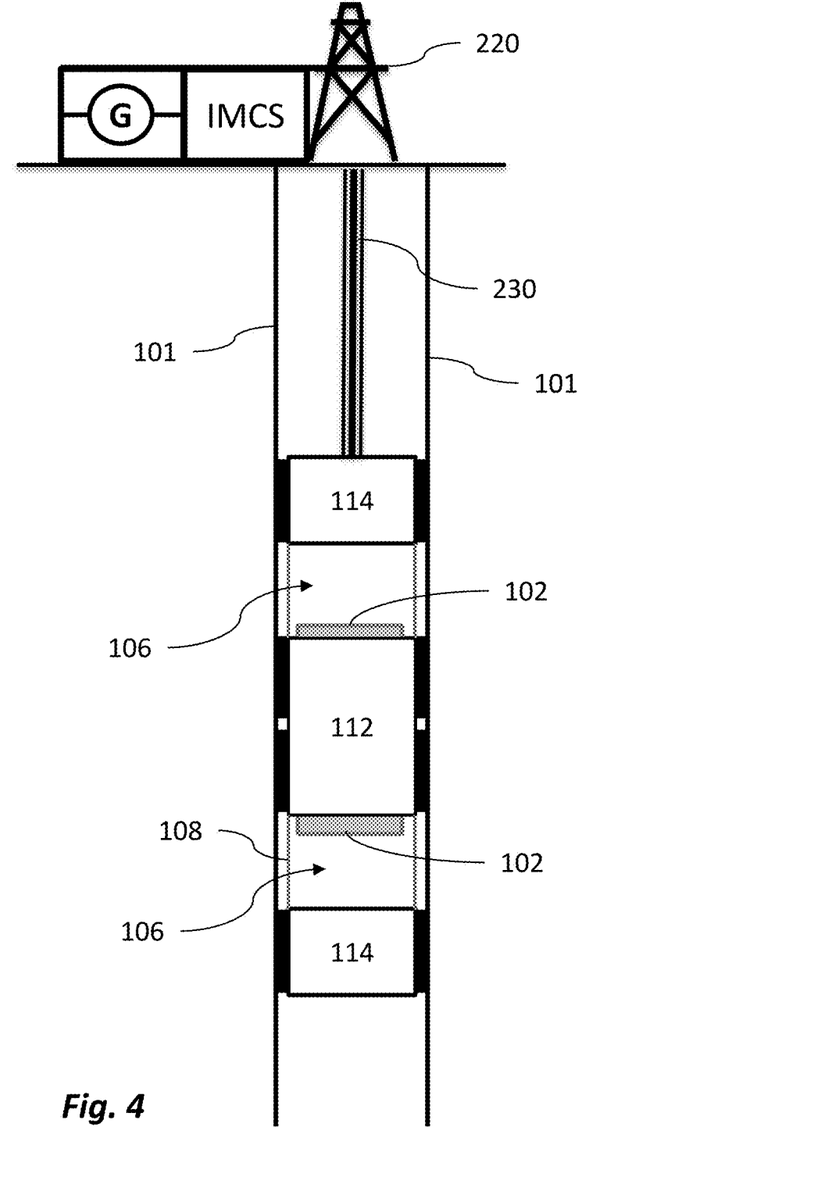
FIG. 4 illustrates still another aspect where two fluid chambers may be used to provide a Downhole Inertial Mass System.

In another non-limiting embodiment of the system disclosed herein, the system is configured so that a PPA is on bottom separated by some distance from a 1XIMA 110 (FIG. 3) or a 2XIMA 112 that is separated by some distance from a PPA 114 on top (FIG. 4). The IMCS with power supply at 220 is on the surface and is programmed to oscillate the 2XIMA 112 in a manner to create pulses from in both fluid chambers 106. Multiple embodiments of the Downhole Inertial Mass System exist by combining various combinations of one or more of each of 1XIMA 110, 2XIMA 112 and PPAs 114 in combination with a power system and an IMCS as illustrated at 220 in FIG. 1, FIG. 3 and FIG. 4.

Figure 5:
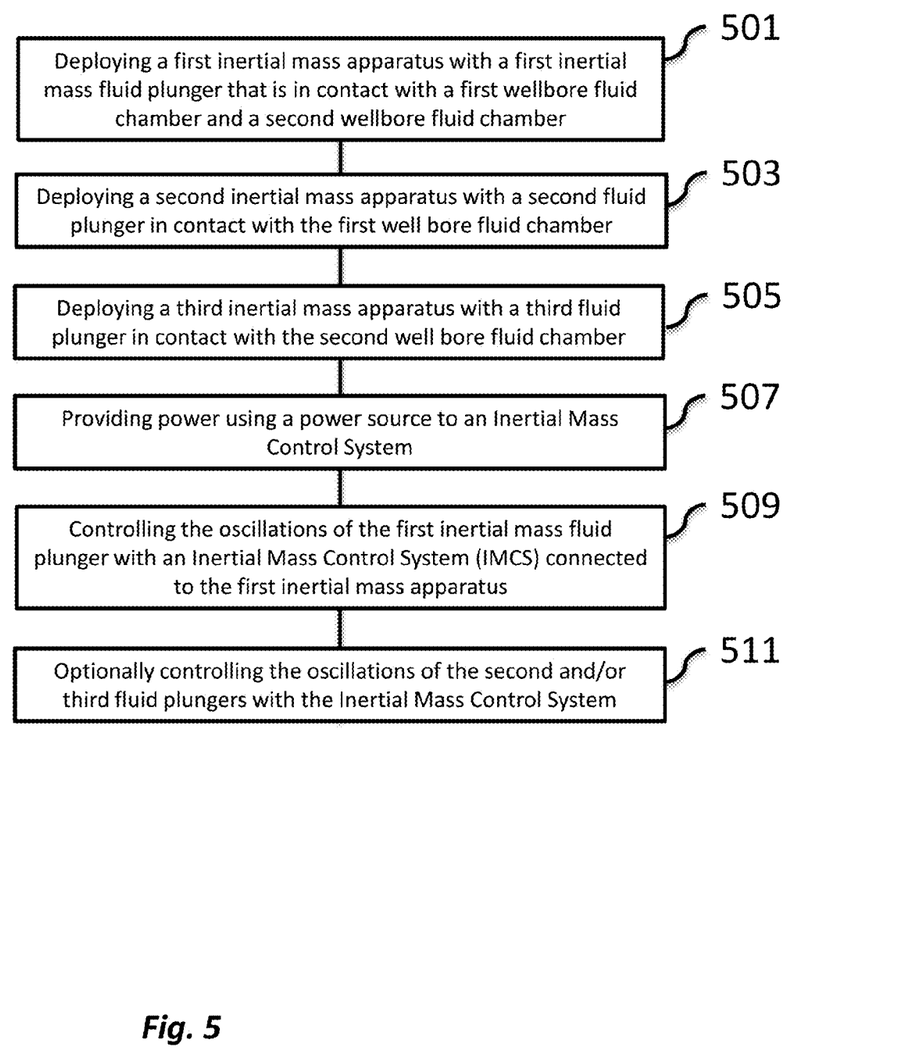
FIG. 5 is a flow chart of an embodiment for deploying a Downhole Inertial Mass System in a wellbore.

In yet another non-limiting embodiment a method for imparting seismic energy with a downhole inertial mass seismic-source within a wellbore, illustrated in FIG. 5, comprises deploying a first inertial mass apparatus with a first inertial mass fluid plunger that is in contact with a first wellbore fluid chamber and a second wellbore fluid chamber 501, deploying a second inertial mass apparatus with a fluid plunger in contact with the first well bore fluid chamber 503, deploying a third inertial mass apparatus with a fluid plunger in contact with the second well bore fluid chamber 505, providing power using a power source to an Inertial Mass Control System 507 and controlling the oscillations of the first inertial mass fluid plunger with an Inertial Mass Control System connected 509 to the first inertial mass apparatus. Optionally, the oscillations of the second or third fluid plungers may be controlled with the Inertial Mass Control System 511.

Technical and economic advantages of various embodiments of the Downhole Inertial Mass System as disclosed provide for a downhole wellbore energy source that couples to the borehole and causes negligible or undetectable damage to the borehole while imparting a known controlled seismic signal that is sufficiently powerful for effective subsurface investigations.

Embodiments of the disclosed system use the fluid in the wellbore to couple seismic source energy to earth formations. The use of wave guide creates the pressure pulses that provide the seismic energy. This Downhole Inertial Mass System provides for higher quality data acquisition due to the higher energy level output than other seismic data utilizing a downhole seismic source. The Downhole Inertial Mass System works for borehole to borehole or borehole to surface. The Downhole Inertial Mass System as disclosed may be advantageously used in fracture detection for well analysis.

The following examples of certain embodiments of the invention are given. Each example is provided by way of explanation of the invention, one of many embodiments of the invention, and the following examples should not be read to limit, or define, the scope of the invention.

In one nonlimiting embodiment a downhole inertial mass seismic-source system for use within a wellbore to provide seismic signal energy at a wellbore location comprises a first inertial mass apparatus with a fluid plunger in contact with a first wellbore fluid chamber and a second wellbore fluid chamber along with a second inertial mass apparatus with a fluid plunger in contact with the first well bore fluid chamber. A third inertial mass apparatus with a fluid plunger is in contact with the second well bore fluid chamber. An Inertial Mass Control System (IMCS) is connected to the first inertial mass apparatus, while a power source provides power to the Inertial Mass Control System.

Other aspects include the Inertial Mass Control System may be connected to the second inertial mass apparatus or that the first inertial mass apparatus is lockable to a position within the wellbore. The IMCS may be programmed to oscillate the first inertial mass apparatus to create a pulse in two wellbore fluid chambers. The distance along the wellbore from the first inertial mass apparatus to the second inertial mass apparatus may be substantially similar to the distance between the first inertial mass apparatus to the third inertial mass apparatus. Support cables may be provided connecting the first inertial mass apparatus to the second inertial mass apparatus. In still other aspects the first inertial mass apparatus further comprises first and second fluid plungers, the first fluid plunger in contact with the first fluid chamber and the second fluid plunger in contact with the second fluid chamber. The first inertial mass apparatus may further comprise the combination of two inertial mass apparatuses with fluid plungers in contact with separate wellbore fluid chambers.

In another non-limiting embodiment a downhole inertial mass seismic-source system for use within a wellbore to provide seismic signal energy at a wellbore location comprises an inertial mass apparatus with a fluid plunger, the fluid plunger in contact with separate wellbore fluid chambers. Also, this embodiment includes first and second passive plug apparatuses with each passive plug apparatus in contact with separate well bore fluid chambers. An Inertial Mass Control System is connected to the first inertial mass apparatus and a power source provides power to the Inertial Mass Control System.

In other aspects the first inertial mass apparatus is lockable to a position within the wellbore or the IMCS is programmed to oscillate the first inertial mass apparatus to create pulses in two wellbore fluid chambers. The distance along the wellbore from the inertial mass apparatus to the first passive plug apparatus may be substantially similar to the distance between the first inertial mass apparatus and the second passive plug apparatus. Support cables may connect the first inertial mass apparatus to the first and second passive plug apparatuses. The first inertial mass apparatus may further comprise first and second fluid plungers with the first fluid plunger in contact with the first fluid chamber and the second fluid plunger in contact with the second fluid chamber. In another aspect the first inertial mass apparatus may further comprise the combination of two inertial mass apparatuses with fluid plungers in contact with separate wellbore fluid chambers.

In still another embodiment a downhole inertial mass seismic-source system for use within a wellbore to provide seismic signal energy at a wellbore location comprises a first inertial mass apparatus with a fluid plunger in contact with a first wellbore fluid chamber, a second inertial mass apparatus with a fluid plunger in contact with the first well bore fluid chamber and an Inertial Mass Control System (IMCS) connected to the first inertial mass apparatus, and a power source providing power to the Inertial Mass Control System.

In other aspects, the Inertial Mass Control System is connected to the second inertial mass apparatus, first inertial mass apparatus may be lockable to a position within the wellbore and the IMCS may be programmed to oscillate the first inertial mass apparatus to create a pulse in the wellbore fluid chamber. In still another aspect, support cables may connect the first inertial mass apparatus to the second inertial mass apparatus.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience: None.

What is claimed is:

1. A downhole inertial mass seismic-source system for use within a wellbore to provide seismic signal energy at a wellbore location, the system comprising:
    a first inertial mass apparatus with a fluid plunger that is in contact with a first wellbore fluid chamber and a second wellbore fluid chamber;
    a second inertial mass apparatus with a fluid plunger in contact with the first well bore fluid chamber;
    a third inertial mass apparatus with a fluid plunger in contact with the second well bore fluid chamber, wherein the first or second well bore fluid chamber is a waveguide for generation of pressure waves;
    an Inertial Mass Control System (IMCS) connected to the first inertial mass apparatus, and
    a power source providing power to the Inertial Mass Control System.

2. The system of claim 1 wherein the Inertial Mass Control System is connected to the second inertial mass apparatus.

3. The system of claim 1 wherein the first inertial mass apparatus is lockable to a position within the wellbore.

4. The system of claim 1 wherein the IMCS is programmed to oscillate the first inertial mass apparatus to create a pulse in two wellbore fluid chambers.

5. The system of claim 1 wherein the distance along the wellbore from the first inertial mass apparatus to the second inertial mass apparatus is substantially similar to the distance between the first inertial mass apparatus to the third inertial mass apparatus.

6. The system of claim 1 further comprising support cables connecting the first inertial mass apparatus to the second inertial mass apparatus.

7. The system of claim 1 wherein the first inertial mass apparatus further comprises first and second fluid plungers, the first fluid plunger in contact with the first fluid chamber and the second fluid plunger in contact with the second fluid chamber.

8. The system of claim 1 wherein the first inertial mass apparatus further comprises the combination of two inertial mass apparatuses with fluid plungers in contact with separate wellbore fluid chambers.

9. A downhole inertial mass seismic-source system for use within a wellbore to provide seismic signal energy at a wellbore location, the system comprising:
- an inertial mass apparatus with a fluid plunger, the fluid plunger in contact with separate wellbore fluid chambers;
- a first and second passive plug apparatus, each passive plug apparatus in contact with separate well bore fluid chambers, wherein any of the separate well bore fluid chamber is a waveguide for generation of pressure waves;
- an Inertial Mass Control System connected to the first inertial mass apparatus, and
- a power source providing power to the Inertial Mass Control System.

10. The system of claim 9 wherein the first inertial mass apparatus is lockable to a position within the wellbore.

11. The system of claim 9 wherein the IMCS is programmed to oscillate the first inertial mass apparatus to create pulses in two wellbore fluid chambers.

12. The system of claim 9 wherein the distance along the wellbore from the inertial mass apparatus to the first passive plug apparatus is substantially similar to the distance between the first inertial mass apparatus and the second passive plug apparatus.

13. The system of claim 9 further comprising support cables connecting the first inertial mass apparatus to the first and second passive plug apparatuses.

14. The system of claim 9 wherein the first inertial mass apparatus further comprises first and second fluid plungers, the first fluid plunger in contact with the first fluid chamber and the second fluid chamber in contact with the second fluid chamber.

15. The system of claim 9 wherein the first inertial mass apparatus further comprises the combination of two inertial mass apparatuses with fluid plungers in contact with separate wellbore fluid chambers.

16. A downhole inertial mass seismic-source system for use within a wellbore to provide seismic signal energy at a wellbore location, the system comprising:
- a first inertial mass apparatus with a fluid plunger that is in contact with a first wellbore fluid chamber;
- a second inertial mass apparatus with a fluid plunger in contact with the first well bore fluid chamber wherein the first well bore fluid chamber is a waveguide for generation of pressure waves;
- an Inertial Mass Control System (IMCS) connected to the first inertial mass apparatus; and
- a power source providing power to the Inertial Mass Control System.

17. The system of claim 16 wherein the Inertial Mass Control System is connected to the second inertial mass apparatus.

18. The system of claim 16 wherein the first inertial mass apparatus is lockable to a position within the wellbore.

19. The system of claim 16 wherein the IMCS is programmed to oscillate the first inertial mass apparatus to create a pulse in the wellbore fluid chamber.

20. The system of claim 16 further comprising support cables connecting the first inertial mass apparatus to the second inertial mass apparatus.

21. A method for imparting seismic energy with a downhole inertial mass seismic-source within a wellbore, the method comprising:
- deploying a first inertial mass apparatus with a first inertial mass fluid plunger that is in contact with a first wellbore fluid chamber and a second wellbore fluid chamber;
- deploying a second inertial mass apparatus with a second fluid plunger in contact with the first well bore fluid chamber;
- deploying a third inertial mass apparatus with a third fluid plunger in contact with the second well bore fluid chamber, wherein the first or second well bore fluid chamber is a waveguide for generation of pressure waves;
- providing power using a power source to an Inertial Mass Control System; and
- controlling oscillations of the first inertial mass fluid plunger with an Inertial Mass Control System (IMCS) connected to the first inertial mass apparatus.

22. The method of claim 21 further comprising connecting the Inertial Mass Control System to the second inertial mass apparatus.

23. The method of claim 21 further comprising locking the first inertial mass apparatus to a position within the wellbore.

24. The method of claim 21 wherein the IMCS is programmed to oscillate the first inertial mass apparatus to create a pulse in two wellbore fluid chambers.

25. The method of claim 21 further comprising deploying the second inertial mass apparatus a distance from the first inertial mass apparatus that is substantially similar to the distance between the first inertial mass apparatus to the third inertial mass apparatus.

26. The method of claim 21 further comprising attaching support cables connecting the first inertial mass apparatus to the second inertial mass apparatus.

27. The method of claim 21 wherein the first inertial mass apparatus further comprises first and second fluid plungers, the first fluid plunger in contact with the first fluid chamber and the second fluid plunger in contact with the second fluid chamber.

28. The method of claim 21 wherein the first inertial mass apparatus further comprises the combination of two inertial mass apparatuses with fluid plungers in contact with separate wellbore fluid chambers.

* * * * *